(12) United States Patent
Honda et al.

(10) Patent No.: US 6,239,694 B1
(45) Date of Patent: May 29, 2001

(54) WARNING DEVICE FOR FILTER-CHANGING TIME

(75) Inventors: Yuji Honda, Okazaki; Hirokazu Imai, Nagoya; Hitoshi Ninomiya, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/553,806

(22) Filed: Apr. 21, 2000

(30) Foreign Application Priority Data

May 17, 1999 (JP) .................................................. 11-136024

(51) Int. Cl.$^7$ ...................................................... B60Q 1/00
(52) U.S. Cl. ......................................... 340/457; 340/457.4
(58) Field of Search .................................. 340/457, 457.4, 340/439, 438

(56) References Cited

U.S. PATENT DOCUMENTS

| | | | |
|---|---|---|---|
| 4,630,027 | * 12/1986 | Muhlberger et al. | 340/457.4 |
| 5,705,977 | * 1/1998 | Jones | 340/457.2 |
| 5,900,811 | * 5/1999 | Shaw et al. | 340/457.4 |
| 5,917,408 | * 6/1999 | Cardillo et al. | 340/439 |
| 6,141,629 | * 10/2000 | Yamamoto et al. | 340/457.4 |

FOREIGN PATENT DOCUMENTS 7-81392   3/1995   (JP) .

\* cited by examiner

*Primary Examiner*—Nina Tong
(74) *Attorney, Agent, or Firm*—Harness, Dickey & Pierce, PLC

(57) ABSTRACT

A warning device for warning change time of a filter for cleaning air includes an indication lamp which indicates a warning of the change time of the filter, and a control unit for controlling operation of the indication lamp. The control unit sets a next timer setting value for the next filter change to a filter-using time until a change of the filter, and operates the indication lamp when the filter-using time passes the next timer setting value after the change of the filter. Thus, the warning of the change time of the filter is performed at a suitable moment reflecting a variation of a clogging degree of the filter. As a result, the warning device accurately performs the warning of the change time of the filer without using a sensor for detecting the clogging degree of the filter.

15 Claims, 5 Drawing Sheets

WARNING DEVICE FOR FILTER-CHANGING TIME

CROSS-REFERENCE TO RELATED APPLICATION

This application is related to and claims priority from Japanese Patent Application No. Hei. 11-136024 filed on May 17, 1999, the contents of which are hereby incorporated by reference.

BACKGROUND OF THE INVENTION

1. Field of the Invention

The present invention relates to a warning device for warning a filter-changing time, which is suitably used for a vehicle air conditioner, for example.

2. Description of Related Art

Because dust and smelling components are physically collected into a filter for an air conditioner, the filter is clogged with using time and using condition, and an air amount passing through the filter is decreased. For preventing a decrease of air-conditioning capacity due to the clogging of the filter, for example, in a conventional vehicle air conditioner described in JP-A-7-81392, an air amount passing through a filter is estimated based on a rotation speed of a blower fan and a vehicle speed, and a filter-changing time is determined so that a warning signal is output.

However, generally, the air amount passing through the filter is changed in accordance with a clogging degree of the filter. Therefore, it is difficult to accurately determine the air amount passing through the filter by the estimate due to the rotation speed of the blower fan and the vehicle speed. Further, the clogging degree of the filter is greatly relative to the using condition of the filter. Here, a sensor for detecting a signal directly relating to the air amount passing through the filter or a sensor for detecting a contaminated degree of air sucked into the filter may be provided so that the filter-changing time is accurately determined. However, in this case, production cost is increased with the sensor arrangement.

SUMMARY OF THE INVENTION

In view of the foregoing problems, it is an object of the present invention to provide a warning device for warning a filter-changing time for an air conditioner, which accurately performs a warning of the filter-changing time without using a sensor relating to a filter clogging, while being produced in low cost.

According to the present invention, a warning device includes a warning indication unit which indicates a warning of a filter-changing time, and a control unit for controlling operation of the warning indication unit. The control unit includes timer means which adds filter-using time for which air passes through the filter, setting means for setting an initial setting value of the timer means, resetting means for outputting a resetting signal for resetting the timer means when the filter is changed, and varying means for varying the initial setting value of the timer means to a next timer setting value after a change of the filter based on the filter-using time until a change of the filter. The control unit operates the warning indication unit, when the filter-using time passes the next setting value after the change of the filter. Thus, the filter-using time until a change of the filter is always used as the next timer setting value after the change of the filter. Therefore, the initial timer setting value is varied to the next timer setting value reflecting variation conditions of a clogging degree of the filter. As a result, a warning of the filter-changing time is performed at a suitable moment corresponding to actual using conditions of the filter, without using a sensor relating to the clogging degree of the filter.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
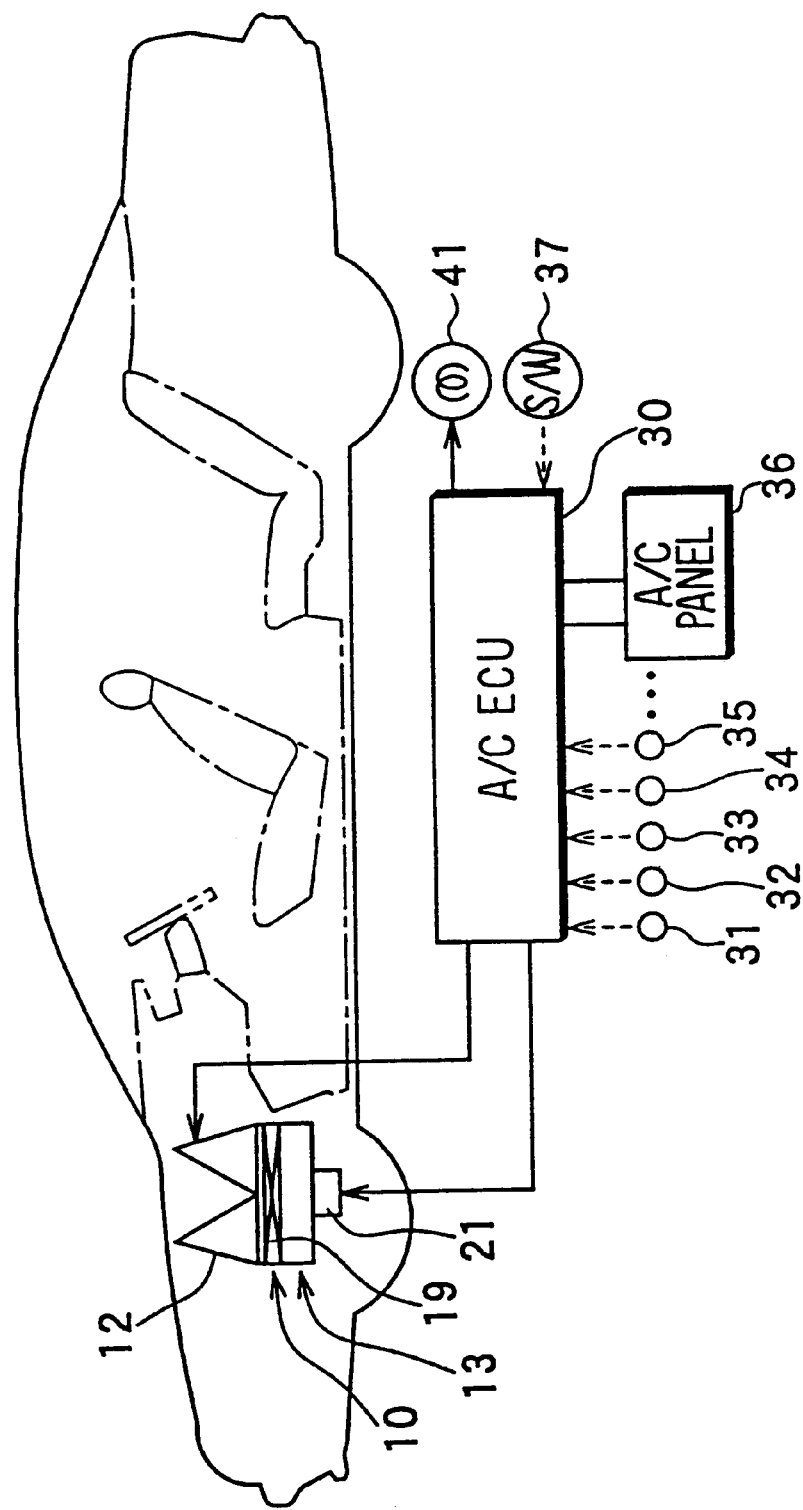
FIG. 1 is a schematic view of an air conditioner mounted on a vehicle according to a first preferred embodiment of the present invention.
Figure 2:
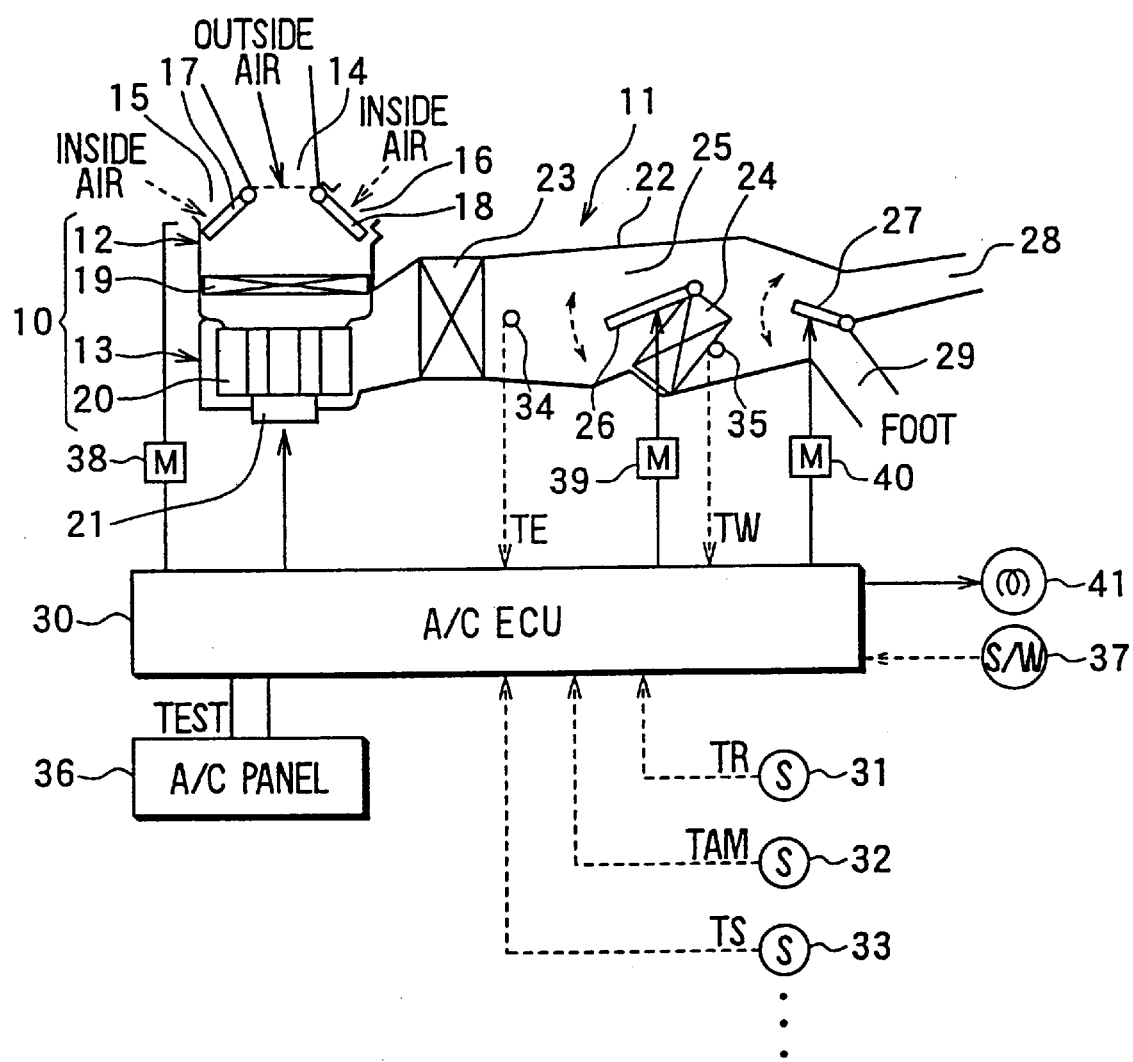
FIG. 2 is a schematic view showing an entire system of the air conditioner for the vehicle according to the first embodiment.

As shown in FIGS. 1, 2, a vehicle air conditioner includes a blower unit 10 and an air conditioning unit 11 for adjusting temperature of air blown from the blower unit 10. Generally, the air conditioning unit 11 is disposed under an instrument panel of the vehicle at an approximate center position in a vehicle width direction, and the blower unit 10 is disposed under the instrument panel to be offset from the air conditioning unit 11 to a front-passenger's seat side in the vehicle width direction.

As shown in FIG. 2, the blower unit 10 includes an inside/outside air switching box 12 disposed at an upper side, and a blower 13 disposed at a lower side of the inside/outside air switching box 12. The inside/outside air switching box 12 is for switching and introducing inside air (i.e., air inside the passenger compartment) or outside air (i.e., air outside the passenger compartment). An outside air introduction port 14 from which outside air is introduced is opened on an upper side surface of the inside/outside air switching box 12. Further, first and second inside air introduction ports 15, 16 from which inside air is introduced are opened on side surfaces of the inside/outside air switching box 12 at both sides of the outside air introduction port 14. Plate-like first and second inside/outside air switching doors 17, 18 are disposed rotatably in the inside/outside air switching box 12 so that the outside air introduction port 14 and the first and second inside air introduction ports 15, 16 are opened and closed by the first and second inside/outside air switching doors 17, 18.

An air introduction passage through which air introduced from the introduction ports 14–16 flows is provided within the inside/outside air switching box 12, and a filter 19 for cleaning the introduced air is provided in the air introduction passage. In the filter 19, dust contained in air is removed and smelling components (e.g., smelling components of exhaust gas such as acetaldehyde) of air are deodorized.

When the filter 19 is used as a dust filter for mainly removing dust contained in air, a filter medium such as a filter paper folding to a wave shape is held in a resin frame body. Further, when the filter 19 is used as a deodorizing filter for mainly deodorizing air, deodorizers (e.g., active carbon) is impregnated in a porous base material such as urethane foam by suitable binders. In this case, the deodorizer-impregnated porous base material is made into a corrugated form (i.e., wave shape) to increase the filter surface area. The edge portions of the porous filter base material are supported by a frame made of resin.

The blower 13 is disposed at a lower side of the filter 19 on a downstream air side of the filter 19. The blower 13 includes centrifugal multi-blades fan 20 (i.e., blower fan) and an electrical motor 21 for driving and rotating the fan 20. At an air outlet portion of the blower 13, an inlet portion of an air conditioning case 22 of the air conditioning unit 11 is connected. Within the air conditioning case 22, a refrigerant evaporator 23 (i.e., cooling heat exchanger) for cooling air is disposed at a most upstream air side, and a heater core 24 (i.e., heating heat exchanger) for heating air is disposed at a downstream air side of the refrigerant evaporator 23.

The heater core 24 is disposed in the air conditioning case 22 to form a bypass passage 25 through which air having passed through the evaporator 23 bypasses the heater core 24. An air amount passing through the bypass passage 25 and an air amount passing through the heater core 24 are adjusted by an air mixing door 26 so that the temperature of air blown into a passenger compartment of the vehicle is adjusted. Conditioned air is blown into the passenger compartment through at least one of a face air outlet 28, a foot air outlet 29 and a defroster air outlet which are selectively opened and closed by an air outlet mode switching door 27.

An air-conditioning electronic control unit (ECU) 30 includes a micro-computer and electrical circuits around the micro-computer. Various air-conditioning components mounted in the blower unit 10 and the air conditioning unit 11 are automatically controlled in accordance with a pre-set program of the ECU 30.

Sensor signals from a sensor group and operation signals from an air-conditioning operation panel 36 disposed on the instrument panel at a vehicle front side are input into the ECU 30. The sensor group includes an inside air temperature sensor 31 for detecting an inside air temperature TR within the passenger compartment, an outside air temperature sensor 32 for detecting an outside air temperature TAM, a sunlight sensor 33 for detecting a sunlight amount entering the passenger compartment, an evaporator temperature sensor 34 for detecting an air temperature TE immediately blown from the evaporator 23, and a water temperature sensor 35 for detecting a water temperature TW flowing into the heater core 24.

On the air-conditioning operation panel 36, a temperature setting unit for setting a temperature TSET of the passenger compartment, an air amount setting unit for setting an air amount blown from the fan 20, a mode setting unit for setting an air outlet mode, an inside/outside air mode setting unit for setting an air introduction mode are disposed. Operation signals from the setting units are input into the ECU 30. Further, an operation signal from a manual operation switch 37 which is operated during a change of the filter 19 is also input into the ECU 30. The manual operation switch 37 is used as a reset unit which outputs a timer reset signal when the filter 19 is changed. That is, the manual operation switch 37 is temporarily turned on when the filter 19 is changed, and is returned to a turn-off state by oneself.

In the first embodiment of the present invention, an operation of a driving motor 38 of the inside/outside air switching doors 17, 18, an operation of a fan driving motor 21, an operation of a driving motor 39 of the air mixing door 26 and an operation of a driving motor 40 of the air outlet mode door 27 are controlled by control signals from the ECU 30. Further, an operation of an indication lamp (warning device) 41 for indicating a warning a changing time of the filter 19 is also controlled by a control signal from the ECU 30.

In FIG. 2, the manual operation switch 37 and the indication lamp 41 are independently separately disposed from the operation panel 36. For example, the manual operation switch 37 and the indication lamp 41 can be disposed at a side of a vehicle meter. However, the manual operation switch 37 and the indication lamp 41 may be disposed on the air-conditioning operation panel 36.

Figure 3:
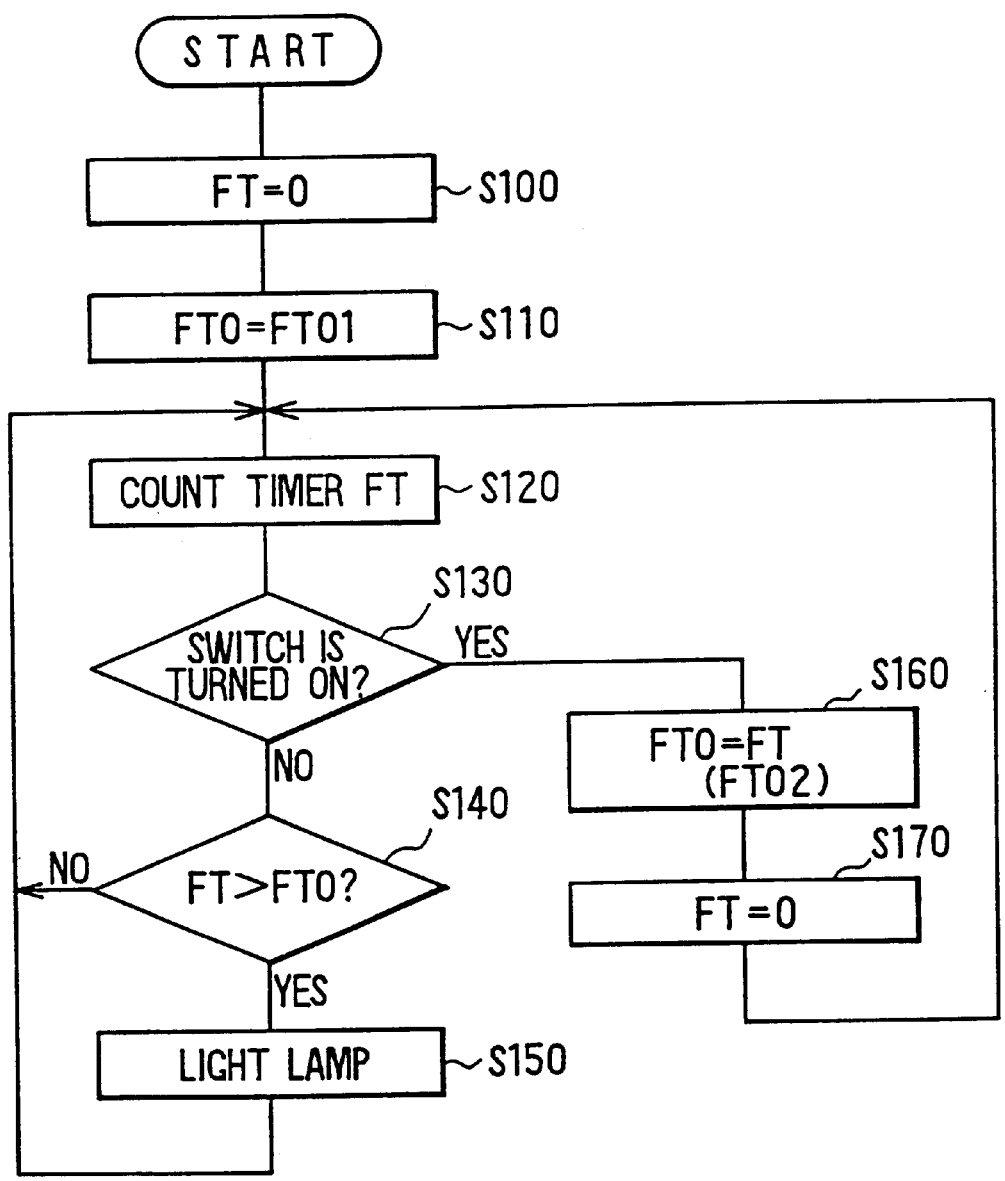
FIG. 3 is a flow diagram showing a warning operation control for filter-changing time according to the first embodiment.

Next, control operation of the indication lamp 41 according to the first embodiment will be now described with reference to FIG. 3. FIG. 3 shows a control routine performed by ECU 30. By a start operation (e.g., a start of the blower 13) of the air conditioner after the air conditioner is mounted on the vehicle, the control routine of the ECU 30 is started. First, at step S100, a timer FT (timer count) is initialized (i.e., FT=0). Next, at step S110, a setting value FTO of the timer FT is set to an initial setting value FT01 (e.g., 600 hr).

Next, at step S120, the timer FT is counted. Specifically, each using time of the filter 19 during the operation of the blower 13 is added. The blower 13 is almost operated in the vehicle air conditioner when the vehicle engine operates. Further, because air passes through the filter 19 by the dynamical pressure (ram pressure) during an outside air introduction mode even when the operation of the blower 13 stops, an operation time of the vehicle engine may be calculated as the using time of the filter 19.

Next, at step S130, it is determined whether or not the manual operation switch 37 is turned on. Because the manual operation switch 37 is turned on with a changing operation of the filter 19, the manual operation switch 37 is turned off during a general using of the filter 19. Therefore, when the filter 19 is in a using state at step S130, that is, when the manual operation switch 37 is tuned off at step S130, it is determined whether or not the timer FT passes the setting value FTO at step S140.

Until the timer FT passes the setting value FTO, the control routine returns at step S120 so that the using time of the filter 19 is continuously added in the timer FT. When the timer FT passes the setting value FTO at step S140, the indication lamp 41 is lighted, and a change necessary state of the filter 19 is warned to a passenger in the passenger compartment.

When the manual operation switch 37 is turned on by an operator of the filter 19 in order to perform a change of the filter 19 at step S130, the timer setting value FTO is changed so that the counted timer FT (i.e., filter using time until the change of the filter 19) is used as a next timer setting value FTO2 at step S160.

For example, in a case where the filter 19 is also used after the indication lamp 41 is lighted and the timer FT until an actual change of the filter 19 becomes longer (e.g., 850 hr), the timer setting value FTO is varied from the initial setting value FTO1 (e.g., 600 hr) to the next setting value FTO2 (e.g., 850 hr). Thereafter, at step S170, the timer FT is reset (i.e., FT=0).

Further, thereafter, until the filter 19 is changed again, the timer FT (i.e., filter-using time) during using of the filter 19 is added at step S120. That is, until the timer FT passes the next timer setting value FTO2 (e.g., 850 hr), the indication lamp 41 is not lighted.

However, when it is founded that the clogging degree of the filter 19 becomes higher during an inspection or the like, a change of the filter 19 is performed even when the timer FT (i.e., filter-using time) is FTO3 (e.g., 800 hr) which is shorter than the next timer setting value FTO2, and the manual operation switch 37 is turned on. Next, the timer setting value FTO is changed to FTO3 (e.g., 800 hr), and the FTO3 is used as the next timer setting value.

According to the first embodiment of the present invention, the filter-using time until a change of the filter 19 is used as the next setting value of the timer setting value FTO. That is, the next setting value of the timer FT after the change of the filter 19 is changed to be equal to the preceding filter-using time. Therefore, a warning can be sent at a suitable filter-change moment corresponding to the clogging variation state of the filter 19.

The clogging degree of the filter 19 is varied in accordance with a vehicle travelling condition (e.g., the streets of a city or an outside of the town), a weather condition, an air-conditioning operation condition (e.g., inside/outside air introduction mode, air amount) and the like. Generally, the filter 19 is changed after the clogging state of the filter 19 is actually checked. Therefore, the filter-using time until the change of the filter 19 indicates a result reflecting various clogging variation conditions in a vehicle. Because the preceding filter-using time is used as the next setting value of the timer setting value FTO, a suitable warning for a filter change is sent. In the ECU 30 of the first embodiment, timer means is constructed by step S120 in FIG. 3, setting means is constructed by step S110 in FIG. 3, and varying means is constructed by step S160 and step S170.

A second preferred embodiment of the present invention will be now described with reference to FIGS. 4 and 5.

In the second embodiment, an air cleaner 50 for specially performing an air cleaning operation is also mounted on a vehicle, in addition to the air conditioner including the blower unit 10 and the air conditioning unit 11 described in the first embodiment. As shown in FIG. 4, the air cleaner 50 is disposed at a vehicle rear side. The air cleaner 50 includes a case 51 having an inside air suction port 52 and an air outlet 56, a blower 53 for sucking inside air of the passenger compartment from the inside air suction port 52, and a filter 55 disposed at a downstream air side of the blower 53 within the case 51, as shown in FIG. 5. The blower 53 is driven by an electrical motor 54. Air blown by the blower 53 is cleaned in the filter 55, and is introduced into the passenger compartment from the air outlet 56.

In the second embodiment, as the filter 19 of the blower unit 10, a dust filter having a relative low pressure loss for mainly removing dust contained in air is used. On the other hand, a deodorizing filter having a relative high pressure loss for mainly deodorizing air is used as the filter 55 of the air cleaner 50. That is, in the filter 55, deodorizers (e.g., active carbon) is impregnated in a porous base material such as urethane foam by suitable binders. Here, the deodorizer-impregnated porous base material is made into a corrugated form (i.e., wave shape) to increase the filter surface area.

Figure 4:
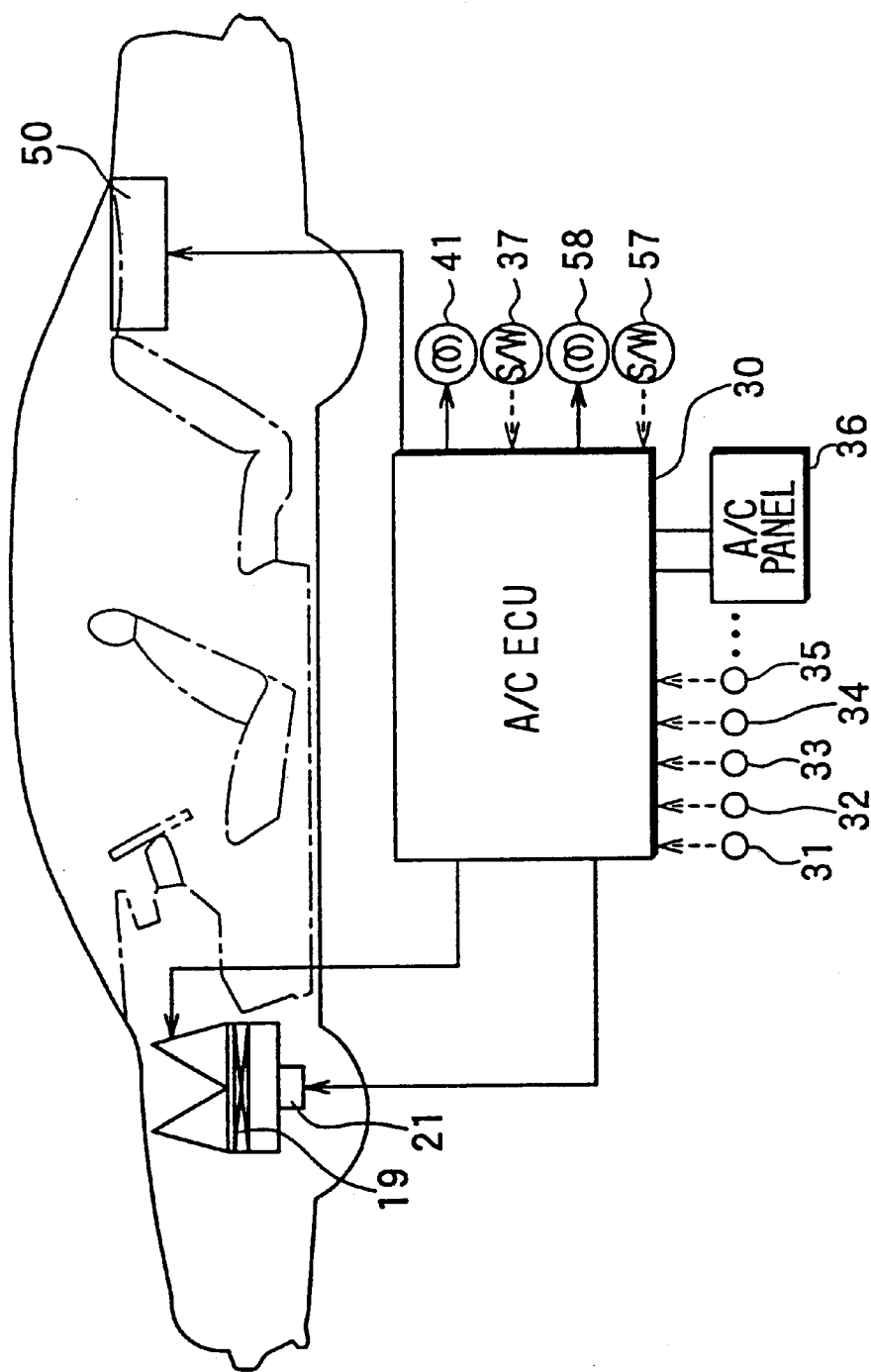
FIG. 4 is a schematic view showing a vehicle air conditioner and an air cleaner mounted on a vehicle according to a second preferred embodiment of the present invention.
Figure 5:
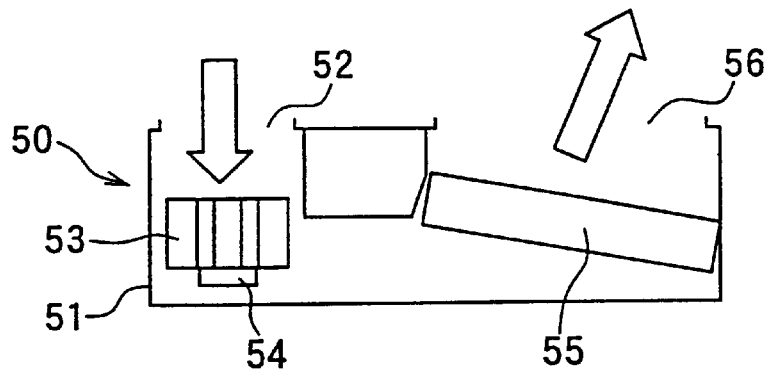
FIG. 5 is a schematic sectional view showing the air cleaner in FIG. 4.

In the second embodiment, as shown in FIG. 4, the manual operation switch 37 and the indication lamp 41 are disposed for warning a change time of the filter 19 of the blower unit 10, while a manual operation switch 57 and an indication lamp 58 are also disposed for warning a change time of the filter 55 of the air cleaner 50. The warning control of the change time of the filter 55 is performed similarly to that of the filter 19, as shown in FIG. 3.

Figure 6:
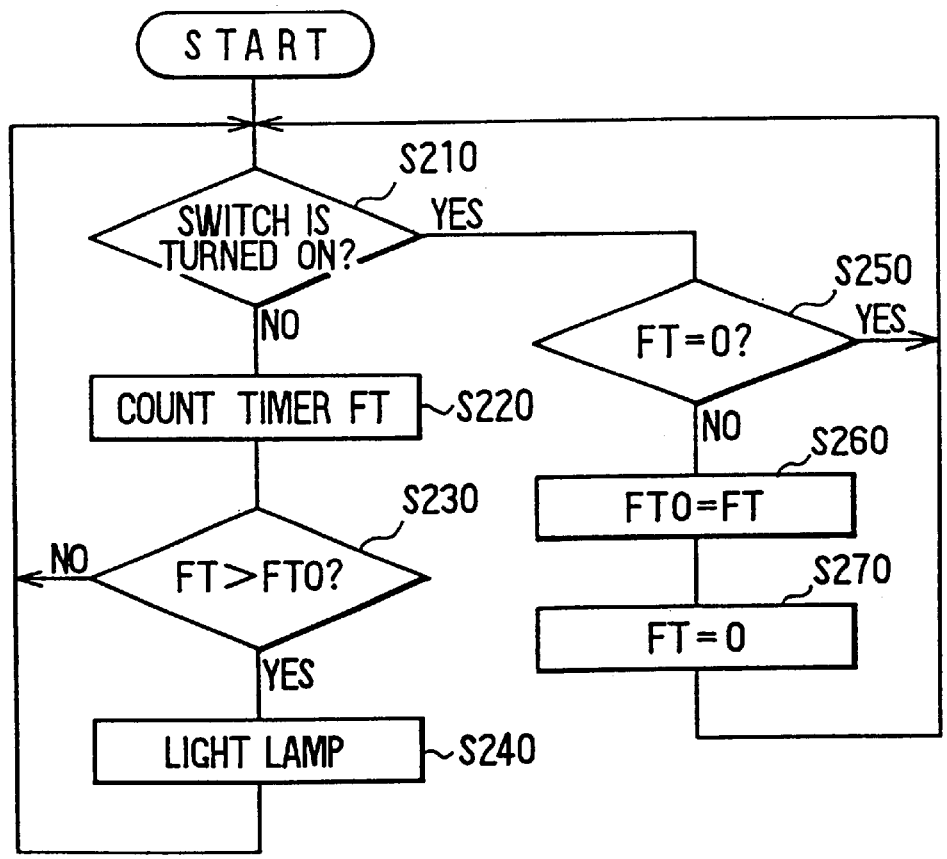
FIG. 6 is a flow diagram showing a warning operation control for filter-changing time according to a third preferred embodiment of the present invention.

A third preferred embodiment of the present invention will be now described with reference to FIG. 6. In the third embodiment, the components of an air conditioner is similar to those of the air conditioner described in the first embodiment. However, in the third embodiment, the operation of the indication lamp 41 for indicating a warning of the change time of the filter 19 is controlled as shown in FIG. 6. That is, after the blower 13 operates, it is determined whether or not the manual operation switch 37 is turned on at step S210. When the manual operation switch 37 is not turned on at step S210, a timer FT is counted at step S220. Specifically, each using time of the filter 19 during the operation of the blower 13 is added. Next, at step S230, it is determined whether or not the timer FT passes a timer setting value FTO at step S230.

Until the timer FT passes the timer setting value FTO, the control routine returns at step S210 so that the filter-using time is continuously added in the timer FT. When the timer FT passes the timer setting value FTO at step S230, the indication lamp 41 is lighted, and a change necessary state of the filter 19 is warned to a passenger in the passenger compartment.

On the other hand, when it is determined that the manual operation switch 37 is turned on at step S210, it is determined whether or not the timer FT is reset (i.e., FT=0) at step S250. When the timer FT is reset (i.e., FT=0) at step S250, the control routine returns at step S210. On the other hand, when the timer FT is not reset at step S250, the timer setting value FTO is varied so that the counted timer time FT is used as the next timer setting value FTO at step S260. Thereafter, the timer FT is reset (i.e., FT=0) at step S270, and the control routine returns at step S210.

In the third embodiment, because the preceding filter-using time is also used as the next timer setting value, the same effect as the first embodiment is provided.

Although the present invention has been fully described in connection with the preferred embodiments thereof with reference to the accompanying drawings, it is to be noted that various changes and modifications will become apparent to those skilled in the art.

For example, in the above-described embodiments of the present invention, instead of the indication lamp 41, 58, a liquid-crystal display may be used. In this case, as the manual operation switch 37, 57, a touch switch provided on the liquid-crystal display may be used. Further, as a warning device for warning the filter-changing time, eyesight means such as a lamp or hearing-sense means such as a voice may be used.

In the above-described embodiments of the present invention, the indication lamp 41, 58 and the manual operation switch 37, 57 are specially provided for warning the change time of the filter 19, 55. However, as an indication lamp and a manual operation switch, existent components provided beforehand may be used in common. For example, a warning of the filter-changing time may be performed by turning on and off of the existent lamp. Further, a reset signal during a filter change may be output by simultaneously pushing existent plural switches.

In the above-described first embodiment of the present invention, when the filter 19 is changed, the initial setting value of the timer is canceled, and the filter-using time until the change of the filter 19 is used as the next timer setting value FTO2. However, as the next timer setting value FTO2, a correction value adding a predetermined correction to the filter-using time may be used. That is, a time shorter than the filter-using time by a predetermined time may be used as the next timer setting value FTO2. Conversely, a time longer than the filter-using time by a predetermined time may be used as the next timer setting value FTO2.

Further, the warning for the filter-changing time may be performed in two steps such as a preliminary warning and a real warning. For example, when the filter-using time reaches to 90% of the timer setting value, the preliminary warning is performed. Further, when the filter-using time passes the timer setting value, the real warning is performed.

Such changes and modifications are to be understood as being within the scope of the present invention as defined by the appended claims.

What is claimed is:

1. A warning device for warning a change time of a filter for cleaning air, the warning device comprising:
    a warning indication unit which indicates a warning of the change time of the filter; and
    a control unit for controlling operation of the warning indication unit, wherein:
    the control unit includes
        timer means which adds filter-using time for which air passes through the filter,
        setting means for setting an end setting value of the timer means,
        resetting means for outputting a resetting signal for resetting the timer means when the filter is changed, and
        changing means for changing the end setting value of the timer means to a first revised value based on the filter-using time until a change of the filter;
    the changing means resets the timer means when the resetting signal is output from the resetting means; and
    the control unit operates the warning indication unit when the filter-using time passes the end setting value.

2. The warning device according to claim 1, wherein the resetting means is a manual operation switch which is manually operated when the filter is changed.

3. The warning device according to claim 1, wherein the changing means changes the end setting value to a second revised value based on the filter-using time until a next change of the filter.

4. The warning device according to claim 1, wherein the changing means changes the end setting value to a correction value of the filter-using time until the change of the filter, corrected by a predetermined time.

5. The warning device according to claim 1, wherein the warning indicating unit is an indication lamp.

6. A warning device for warning a change time of a filter for cleaning air, the warning device comprising:
    a warning indication unit which indicates a warning of the change time of the filter; and
    a control unit for controlling operation of the warning indication unit, wherein:
    the control unit includes
        a timer which adds filter-using time for which air passes through the filter,
        setting means for setting a timer end setting value of the timer,
        resetting means for resetting the timer when the filter is changed, and
        changing means for changing the timer end setting value of the setting means based on the filter-using time until a change of the filter; and
    the control unit operates the warning indication unit when the filter-using time passes the timer end setting value.

7. The warning device according to claim 6, wherein the resetting means is a manual operation switch which is manually operated when the filter is changed.

8. The warning device according to claim 6, wherein the changing means changes the timer end setting value for the next change of the filter to the filter-using time until the change of the filter.

9. The warning device according to claim 6, wherein the changing means changes the timer end setting value for the next change of the filter to a correction value of the filter-using time until the change of the filter, corrected by a predetermined time.

10. An air conditioner for a vehicle, comprising:
    a case having an air suction port for introducing air;
    a blower for blowing air introduced from the air suction port;
    a filter for cleaning air introduced from the air suction port;
    a heat exchanger for controlling temperature of air to be blown into a passenger compartment of the vehicle;
    a warning device for warning a change time of the filter; and
    a control unit for controlling operation of the warning device, wherein:
    the warning device includes a warning indication unit which indicates a warning of the change time of the filter; and
    the control unit includes
        a timer which adds filter-using time for which air passes through the filter,
        setting means for setting a timer end setting value of the timer,
        resetting means for resetting the timer when the filter is changed, and
        changing means for changing the timer end setting value of the setting means based on the filter-using time until a change of the filter; and
    the control unit operates the warning indication unit when the filter-using time passes the timer end setting value.

11. The air conditioner according to claim 10, wherein the filter-using time is calculated by a blower operation time for which the blower operates.

12. The air conditioner according to claim 10, wherein the filter-using time is calculated by an engine operation time for which an engine of the vehicle operates.

13. The air conditioner according to claim 10, wherein the resetting means is a manual operation switch which is manually operated when the filter is changed.

14. The air conditioner according to claim 10, wherein the changing means changes the timer end setting value for the next change of the filter to the filter-using time until the change of the filter.

15. The air conditioner according to claim 10, wherein the changing means changes the timer end setting value for the next change of the filter to a correction value of the filter-using time until the change of the filter, corrected by a predetermined time.

* * * * *